Feb. 9, 1965 F. W. LIVERMONT 3,168,944
TORQUE LIMITER HAVING OVERLOAD RELEASE CLUTCH FOR POWER-OPERATED SCREW DRIVER OR THE LIKE
Filed Nov. 8, 1955 6 Sheets-Sheet 1
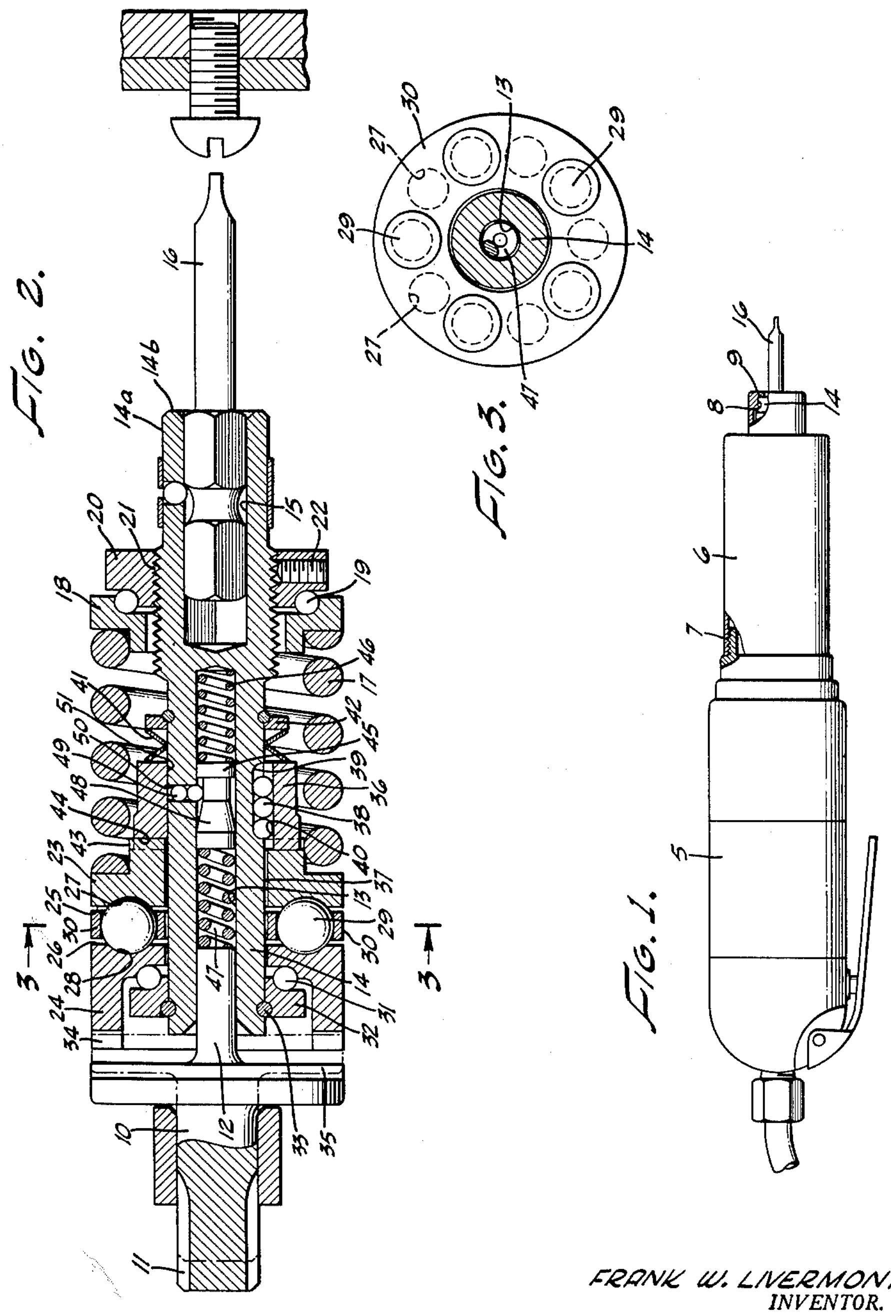
FRANK W. LIVERMONT
INVENTOR.
BY Lyon & Lyon
ATTORNEYS

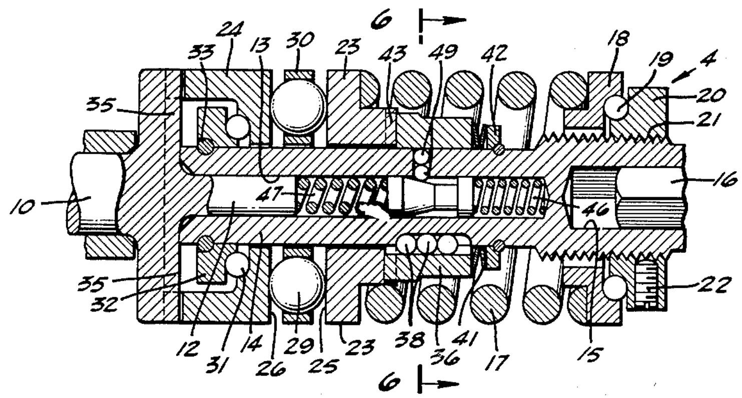
FIG. 4.
FIG. 6.
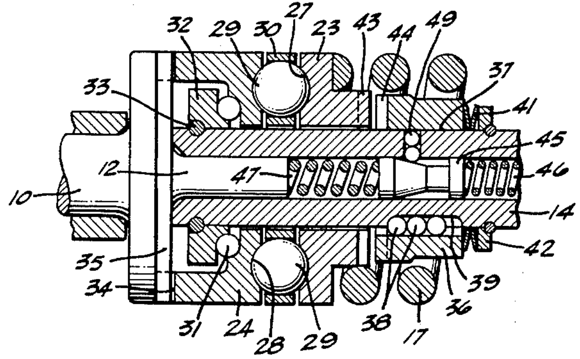
FIG. 5.
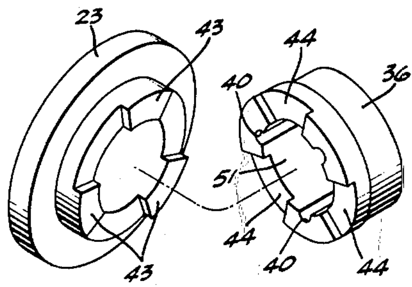
FIG. 7.
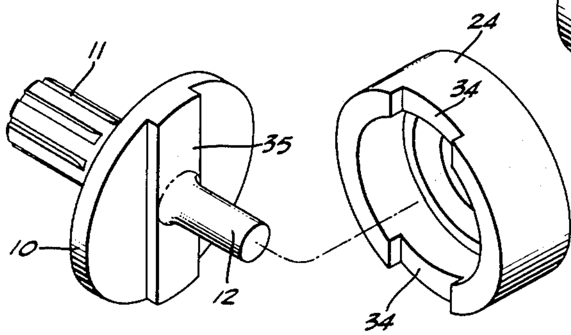
FIG. 8.
FRANK W. LIVERMONT
INVENTOR.
BY Lyon & Lyon
ATTORNEYS TORQUE LIMITER HAVING OVERLOAD RELEASE CLUTCH FOR POWER-OPERATED SCREW DRIVER OR THE LIKE Filed Nov. 8, 1955 6 Sheets-Sheet 3

90 91 92 100 98 99 101 94 108 95 96 97 106 103 102 104 105 107 109 93

FRANK W. LIVERMONT
INVENTOR.

BY Lyon & Lyon
ATTORNEYS

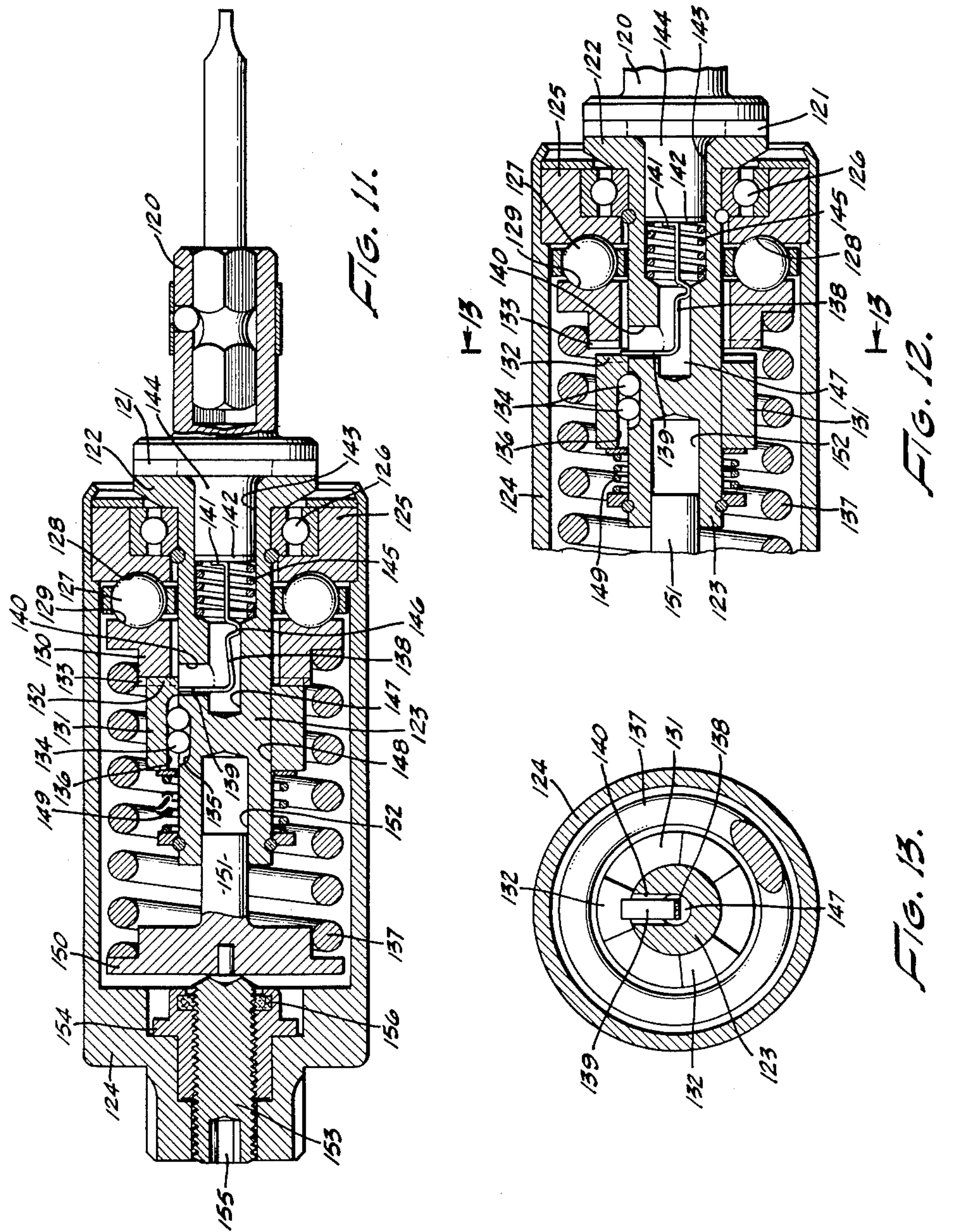
FRANK W. LIVERMONT
INVENTOR.
BY Lyon & Lyon
ATTORNEYS

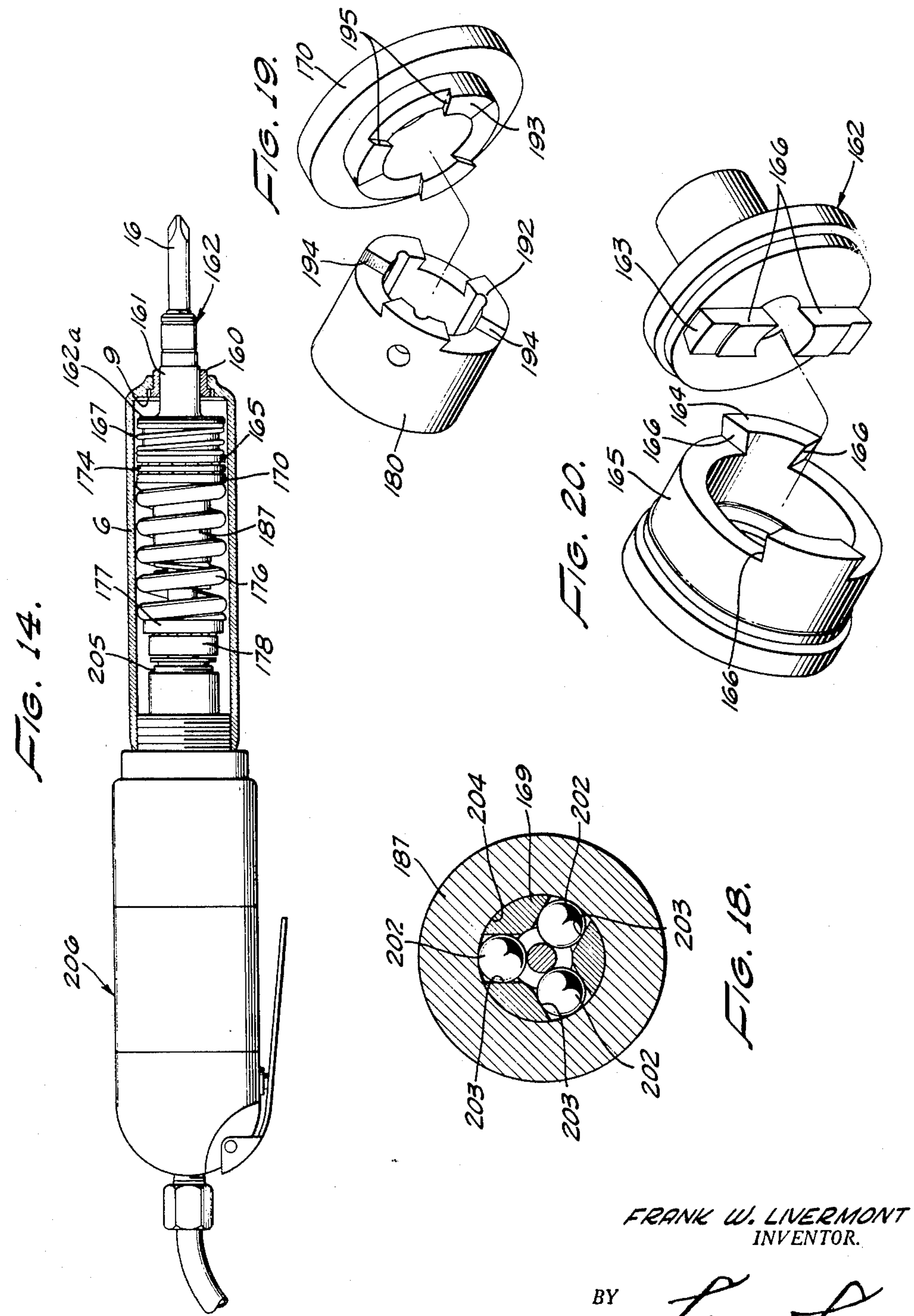
FRANK W. LIVERMONT
INVENTOR.
BY Lyon & Lyon
ATTORNEYS

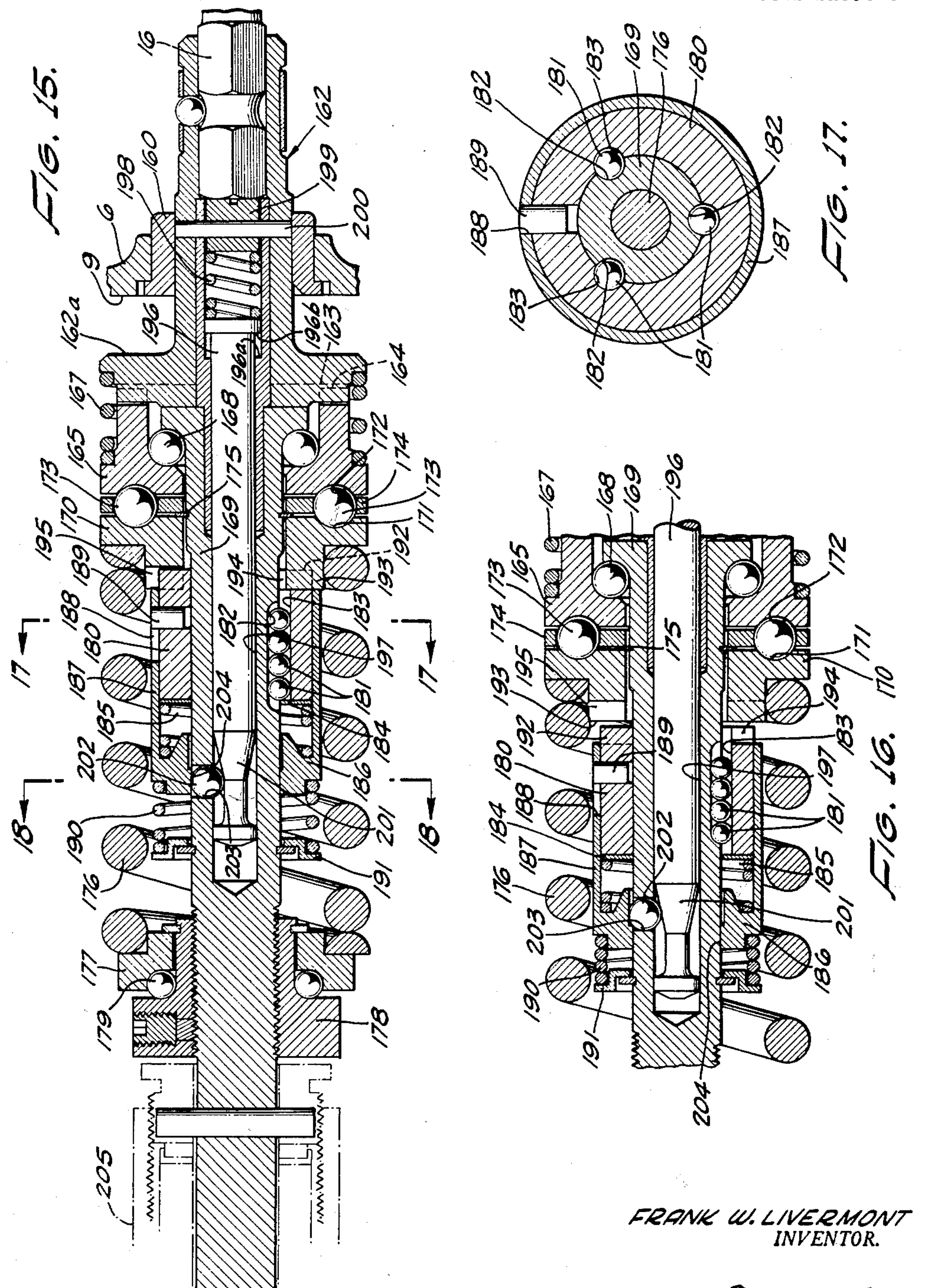
FRANK W. LIVERMONT
INVENTOR.
BY Lyon & Lyon
ATTORNEYS 3,168,944

TORQUE LIMITER HAVING OVERLOAD RELEASE CLUTCH FOR POWER-OPERATED SCREW DRIVER OR THE LIKE

Frank W. Livermont, Duarte, Calif.; Milford S. Zimmerman, executor of said Frank W. Livermont, deceased, assignor to Reed Roller Bit Company, Houston, Tex., a corporation of Texas Filed Nov. 8, 1955, Ser. No. 545,735
8 Claims. (Cl. 192—56)

This invention relates to power-operated torque wrenches and other tools and is particularly directed to an improved form of torque limiting device for power-operated screw drivers and the like.

This application is a continuation-in-part of my co-pending application Serial No. 462,209, filed October 14, 1954, now abandoned.

Efficient use of threaded fastenings often requires careful attention to the amount of torque applied. Manually operated torque wrenches and screw drivers are often provided with adjustable overload cut-out devices which serve to prevent application of torque beyond a predetermined limit. In such manually operated tools the operator ceases to apply additional torque as soon as the trip signal is given or as soon as other indication is provided that the desired torque limit has been reached.

In power-operated rotary torque applying tools, however, it is often difficult or impossible for the operator to remove the tool from the work or to prevent further application of torque after the desired torque limit has been achieved. Conventional devices of this type employ power transmitting clutch jaws which disengage when the torque load exceeds the predetermined limit. However, in the operation of such tools the jaws are engaged almost instantly and again apply torque to the work. The jaws continue to engage and disengage very rapidly with the result that impact loading is applied to the work in the manner of an impact nut runner until such time as the operator retracts the tool away from the work.

For example, a commercial form of power-operated rotary torque limiter was driven at 2,000 r.p.m. by an air motor and was set to "trip" at 10-inch pounds of torque. In this particular device the jaws engaged and disengaged four times for each revolution. If the operator required one-half second in which to retract the tool from the work after tripping occurred, several hundred impacts were applied to the work after the pre-set torque value was achieved. The effects of these impacts was to apply excessive torque to the work. It was found that while the tool initially tripped at 10-inch pounds that an equivalent of 25-inch pounds was built up by the impacting action if the tool were permitted to remain in contact with the work. In actual practice, a torque varying from 15 to 25-inch pounds was built up depending upon the operator's speed in removing the tool from the work.

It is the principal object of this invention to provide a power-operated torque tool of the type described which ceases to transmit any torque after the initial tripping action and which avoids application of impact forces to the work. Such a tool of the type contemplated by this invention permits the driving motor and the major portion of the torque limiter device to spin freely after the work has been "set up" to the desired torque value.

Another object is to provide a torque limiting tool of this type which may be used to turn threaded fastenings of any type to the desired torque, and without danger of applying excessive torque thereto.

Another object is to provide such a tool which can be employed with any desired prime mover such as an air motor or an electric motor or a drill press.

Another object is to provide such a tool which may be used to tighten large numbers of fastenings to the desired torque with a minimum percentage of variation.

Another object is to provide such a device which lends itself to economical manufacture on a quantity production basis.

Another object is to provide a torque limiting tool of this type which employs a circumferential series of balls interposed between confronting radial faces of separate rotary parts, said faces having shallow indentations or dimples to receive the balls, together with means for interrupting the power transmission connection through the tool upon axial separation of said parts under torque load.

Other and more detailed objects and advantages will appear hereinafter.

In the drawings:

FIGURE 1 is a side elevation showing a power-driven screw driver embodying the torque limiter device of this invention.

FIGURE 2 is a longitudinal sectional elevation showing a preferred form of torque limiter.

FIGURE 3 is a transverse sectional view taken substantially on the lines 3—3 as shown in FIGURE 2.

FIGURE 4 is a view similar to FIGURE 2 showing the parts in different positions.

FIGURE 5 is a view similar to FIGURE 2 showing the parts in different positions.

FIGURE 6 is a transverse sectional view taken substantially on the lines 6—6 as shown in FIGURE 4.

FIGURE 7 is a perspective view.

FIGURE 8 is a perspective view.

FIGURE 11 is a transverse sectional view showing a third modification.

FIGURE 12 is a view similar to FIGURE 11 showing the parts in a different position.

FIGURE 13 is a transverse sectional view taken substantially on the lines 13—13 as shown in FIGURE 12.

FIGURE 14 is a side elevation partly broken away showing another modification.

FIGURE 15 is a longitudinal sectional elevation thereof.

FIGURE 16 is a view similar to FIGURE 15, but showing the parts in a different position.

FIGURE 17 is a sectional view taken substantially on the lines 17—17, as shown in FIGURE 15.

FIGURE 18 is a sectional view taken substantially on the lines 18—18, as viewed in FIGURE 15.

FIGURE 19 is a perspective view showing certain of the clutch parts.

FIGURE 20 is a perspective view showing certain other clutch parts.

Figures 9, 10:
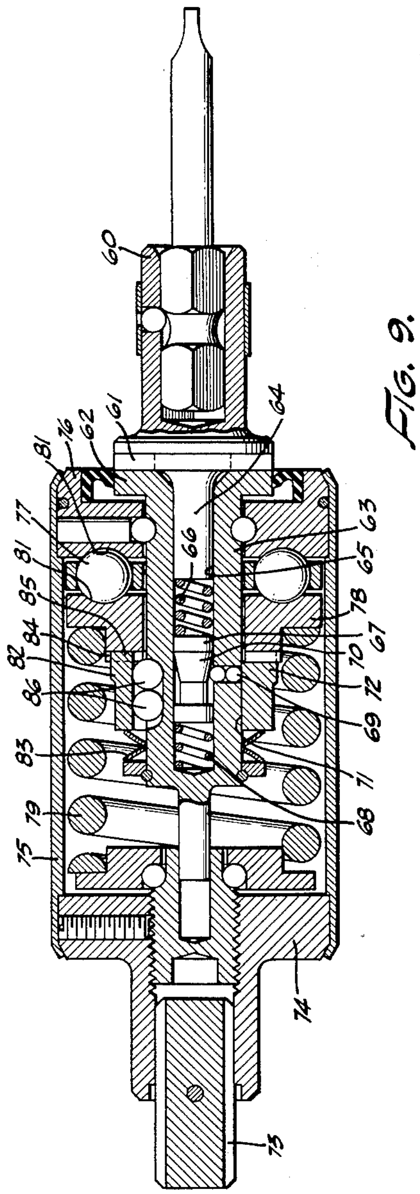
FIGURE 9 is a transverse sectional view showing a modification.
FIGURE 10 is a transverse sectional view showing a second modification.

Referring to the drawings and considering a preferred form of the invention shown in FIGURES 1–8 the driving member generally designated 10 is driven through splines 11 and is provided with a central axial post 12. This post 12 is cylindrical and is slidably received within the bore 13 of the work holding member 14. This member 14 is provided with a drive socket 15 at one end for reception of a suitable tool such as, for example, a screw driver 16. Means are provided for establishing a releasable driving connection between the driving member 10 and the driven member 14. This means includes the coaxial coil spring 17 having a first collar 18 at one end. A bearing assembly 19 supports the collar 18 on the nut 20 which engages the threads 21 provided on the work holding member 14. The nut is held in adjusted position on the threads 21 by means of the pin 22.

A second collar 23 is provided at the other end of the coil spring 17. A ring 24 encircles a portion of the driven member 14. The second collar 23 and ring 24 are provided with radial confronting faces 25 and 26 respectively and a circumferential series of shallow indentations 27 and 28 are provided in these confronting faces. A series of balls 29 is interposed between the confronting faces 25 and 26 and are received within the shallow indentations 27 and 28. A retainer 30 may be provided to maintain the balls 29 in properly spaced relationship.

The ring 24 is mounted on a bearing 31 carried on the removable flange 32. This flange 32 is held in place by means of a circular retainer 33. Clutch jaws 34 on the ring 24 are engageable with the clutch jaws 35 on the driving member 10.

A clutch sleeve 36 is slidably mounted on the outer cylindrical surface 37 of the driven member 14. This clutch sleeve 36 is prevented from turning relative to the member 14 by means of the balls 38 which extend into the axial keyways 39 in the member 14 and into the axial keyways 40 in the sleeve 36. The balls 38 function as keys but reduce the friction since they roll instead of slide. A relatively light spring 41 is interposed between the sleeve 36 and the stop collar 42. The stop collar 42 is fixed on the outer surface 37 of the member 14. The force of the light spring 41 tends to move the sleeve 36 axially toward the second collar 23.

Clutch jaws 43 are provided on the second collar 23 and mating clutch jaws 44 are provided on the sleeve 36. The light spring 41 acts to maintain these clutch jaws 43 and 44 in engagement.

A piston element 45 is slidably mounted within the bore 13 of the driven member 14. One end of this piston element is engaged by a relatively light spring 46 and the other end is engaged by a stronger spring 47. The piston element is provided with a conical surface 48 between its ends and this surface engages balls 49 which are mounted to move in radially extending opening 50 provided in the driven member 14. When the piston element moves to the right, the balls 49 are brought into frictional engagement with the cylindrical bore 51 in the sleeve 36. When the piston element 45 moves to the left, the balls 49 are released so that the sleeve 36 is free to move axially.

The torque limiter assembly generally designated 4 is held in position with respect to the air motor assembly 5 by means of the stationary enclosing shell 6. This shell 6 is connected to the stationary motor housing by means of the threads 7. The bore 8 has a loose running fit with the cylindrical surface **14*a* of the driven member and also has a shoulder 9 which engages the end surface 14*b*** of the work member.

In operation the end of the screw driver 16, or other tool, is inserted into or otherwise engaged with the work. Axial pressure is then applied to the driving member 10, thereby closing the clutch jaws 34 and 35. At the same time the post 12 moves inwardly against the coil spring 47 and causes the piston element 45 to move to the right against the action of the weak spring 46. The conical surface 48 moves the balls 49 radially outward into frictional engagement with the bore 51 of the sleeve 36.

Rotation of the driving member 10 causes the clutch jaws 35 and 34 to turn the ring 24. The balls 29 remain within their respective indentations 28 and 27 and, therefore, serve to drive the second collar 23 so that it turns as a unit with the ring 24. The clutch jaws 43 and 44 drive the sleeve 36. The balls 38, acting as keys, serve to turn the work holding member 14.

The entire device turns as a unit until the torque resistance to the work reaches a predetermined magnitude. At that instant, the resistance to turning becomes greater than the torque which the balls 29 can transmit to the second collar 23. The second collar 23 moves axially in a direction to compress the main spring 17 and the additional clearance between the confronting faces 26 and 25 permits the balls each to roll out of the respective indentations 28 and 27. Each ball rolls out of its indentations and then drops into the next indentation in the series. This permits the spring 17 to return the second collar axially towards its initial position. However, the sleeve 36 does not return to its initial position because it is frictionally prevented from doing so by the action of the balls 49. The result is that the clutch jaws 43 and 44 are disengaged. The parts are then in the position shown in FIGURE 5.

The disengagement of the jaws 43 and 44 interrupts the driving connection from the driving member 10 to the driven member 14 and the result is that the driven member 14, which holds the tool 16, instantly comes to rest while the driving member 10, ring 24, second collar 23, spring 17 and first collar 18 continue to rotate. The second collar 23 does not reciprocate axially during this continued rotation because no torque resistance is applied to it; it simply rotates with the ring 24.

The operator retracts the driving motor and torque limiter device in an axial direction. This action serves to disengage the clutch jaws 34 and 35 and thereby allows the rotating parts of the torque limiter mechanism to come to rest. The same axial movement which disengages the clutch jaws 34 and 35 causes the post 12 to move away from the spring 47, thereby permitting the weaker spring 46 to shift the piston element 45 to its initial position. The balls 49 move radially inward to release the sleeve 36 and permit the spring 41 to return the jaws 43 and 44 into engagement. The cycle is then repeated to tighten successive fastenings. The degree of compression of the spring 17 may be changed by means of the adjusting nut 20 mounted on the threads 21 of the work holding member 14 and this adjustment serves to determine the maximum value of torque transmitted by the tool.

The modified form of my invention shown in FIGURE 9 is similar in many respects to that form just described and, therefore, a detailed description of the parts is believed to be unnecessary. The work holding member 60 is moved axially to bring the screw driver or other tool into engagement with the work. This action closes the jaws 61 and 62 thereby connecting the hollow shaft 63 in direct driving relationship with the work holding member 60. At the same time, the post 64 moves into the bore 65 to compress the spring 66 and thereby moves the piston element 67 to the left against the action of the relatively weak spring 68. The balls 69 are moved radially outward by the conical surface 70 into frictional engagement with the bore 71 of the sleeve 72. Rotary movement of the driving member 73 is transmitted through the end flange 74 and housing 75 fixed thereto to drive the ring 76. The ring 76 is fixed to the housing and turns therewith. The balls 77 transmit the torque to the second collar 78 until such time as the torque limit is reached. At that instant, the second collar 78 moves axially to compress the main spring 79 under action of the balls 77 moving out of the indentations 80 and 81.

This axial movement of the second collar 78 carries the sleeve 82 with it, compressing the light spring 83. When the balls 77 drop into the next indentation in the series, the second collar 78 returns to its initial position under the action of the main spring 79 but separating the clutch jaws 84 and 85. This disengages the drive to the hollow shaft 63 via the balls 86 and permits the hollow shaft 63 and work holding member 60 instantly to come to rest. The driving member 73, housing 75, ring 76, balls 77, second collar 78 and spring 79 continue to turn. When the operator retracts the tool away from the work the jaws 61 and 62 are disengaged and the piston element 70 returns to its initial position under action of the light spring 68, thereby releasing the friction restraint on the sleeve 72. The spring 83 closes the clutch jaws 84 and 85, and the tool is ready to repeat its cycle.

In the operation of the modified form of my invention shown in FIGURE 10 the work engaging tool is received within the work holding member 90. Axial movement closes the clutch jaws 91 and 92. Rotation of the driving member 93 drives the second collar 94 through the balls 95. These balls 95 engage axial keyways 96 and 97 formed in the collar 94. The balls 98 are received within the indentations 99 and 100 and serve to transmit torque from the second collar 94 to the ring 101 until the maximum torque value is reached. At that instant, the balls 98 roll out of their respective indentations 99 and 100, thereby increasing the space between second collar 94 and ring 101. The second collar 94 moves axially in a direction to compress the main spring 102.

When the second collar 94 is shifted axially for a sufficient distance to permit the balls 98 to roll out of the indentations 99 and 100, the recess 103 in the second collar 94 permits entry of the ball 104. One or more of the balls 104 and recesses 103 may be employed. The ball 104 is moved radially outward through opening 105 in the wall of the driving member 93 and is impelled in that direction by the conical surface 106 on the piston element 107.

The second collar 94 is, therefore, latched in retracted position and consequently torque is no longer transmitted from the balls 98 to the ring 101. The ring 101 and work holding member 90 stop rotating although the driving member 93, second collar 94 and spring 102 continue to turn. When the operator retracts the motor and torque limiting device in an axial direction, the clutch jaws 91 and 92 are disengaged and the force on the spring 108 is reduced so that the relatively light spring 109 may return the piston element 107 to its initial position. This action allows the ball 104 to move radially inward and release the second collar 94 so that the balls 98 are again engaged between the indentations 99 and 100.

In the operation of the further modified form of my invention shown in FIGURE 11, the tool held in the work holding member 120 is brought into engagement with the work through axial movement. This movement closes the clutch jaws 121 and 122 and places the work holding member 120 in driving relationship with the hollow shaft 123. Rotary movement of the driving member 124 turns the ring 125 which is secured within the forward end thereof. The ring 125 is supported by means of a roller bearing assembly 126 on the hollow shaft 123. The balls 127 are received within the indentations 128 and 129 and serve to drive the second collar 130 from the ring 125. The second collar 130 drives the sleeve 131 through clutch jaws 132 and 133. Balls 134 engage within axial keyways 135 and 136 in the hollow shaft 123 and sleeve 131, respectively, and serve to transmit torque from the sleeve 131 to the hollow shaft 123. The main spring 137 holds the balls 127 in engagement with the indentations 128 and 129 until such time as the maximum torque is reached. The balls then roll out of the indentations 128 and 129 against the action of the spring 137 thereby shifting the second collar 130 and sleeve 131 to the left.

A leaf spring 138 formed of flat wire is provided with a finger 139 which extends through an opening 140 in the wall of the hollow shaft 123. This leaf spring 138 also has a foot portion 141 fixed to a plate 142 slidably mounted within the bore 143. The plate 142 is engaged on one side by the end of the post 144 on the work holding member 120. On the other side it is engaged by the coil spring 145. When the clutch jaws 121 and 122 are closed the plate 142 is moved toward the left in a direction to compress the spring 145, and the V-shaped section 146 of the leaf spring 138 is moved out of the bore 143 and into the smaller bore 147. The projecting end of the finger 139 contacts the bore 148 of the sleeve 131. When the sleeve 131 is shifted in a direction to compress the spring 149, the finger 139 of the leaf spring 138 projects out of the opening 140 and acts as a stop to maintain the sleeve 131 in retracted position so that the clutch jaws 132 and 133 are disengaged.

Disengagement of the jaws 132 and 133 interrupts the transmission of torque through the tool and permits the hollow shaft and work holding member 120 to come to rest. The driving member 124, ring 125, balls 127, second collar 130 and main spring 137 continue to rotate.

When the operator withdraws the tool axially from the work, the clutch jaws 121 and 122 are disengaged and the spring 145 moves the plate 142 so that the V-shaped section 146 of the leaf spring 138 moves out of the small bore 147. The finger 139 is thereby retracted into the opening 140, allowing the sleeve 131 to move forward under the action of the spring 149. This brings the clutch jaws 132 and 133 into engagement. The tool is then ready to repeat its cycle. The first collar 150 has a post 151 which is rotatably received within the bore 152 of the hollow shaft 123. This first collar 150 turns with the spring 137 and also rotates with the adjusting screw 153 which contacts it in a central location. The adjusting screw turns within a nut 154 press-fitted into the driving member 124. The adjusting screw 153 may be turned by means of its exposed socket 155 and is held in adjusted position by means of the fiber washer 156 carried by the nut 154.

In each of the modified forms of my invention, as described above, the stationary shell 6 encloses the torque limiter device and provides a loose running fit at the forward end of the work holder. Furthermore, the shoulder 9 within the shell 6 engages the extreme forward end of the work holder, in each case. Furthermore, in each of the modifications as well as the preferred form, the proportions of the parts are such that the main clutch jaws must be fully disengaged before the axial clutch parts are returned to closed position. If this were not true, the additional torque impulses could be applied to the work before the main clutch jaws were fully disengaged.

In the modified form of my invention shown in FIGURES 14–20, the stationary shell 6 encloses the torque limiter device in the manner previously described. The forward end of the shell 6 is provided with a bushing 160 which receives the outer surface 161 of the work holder 162 in free running relation. The shoulder 9 on the stationary shell 6 is engageable with the surface **162*a* on the work holder 162. The tool 16 is received removably in the work holder in the manner previously described. Clutch jaws 163 are provided on the work holder 162 and these jaws engage with complementary jaws 164 provided on the ring 165. The engaging faces 166 of the clutch jaws 163 and 164 are formed with a negative rake angle, as best shown in FIGURE 20. A coil spring 167 is operatively interposed between the work holder 162 and the ring 165**.

A bearing assembly 168 supports the ring 165 on the driving member or shaft 169. The ring 165 and collar 170 are provided with radial confronting faces having a circumferential series of shallow indentations 171 and 172. A series of balls 173 is interposed between the confronting faces and is received within the shallow indentations. A retainer 174 is provided to maintain the balls 173 in properly spaced relationship. A snap ring 175 is mounted in a groove on the driving member 169 and serves to prevent displacement of the ball retainer 174 in a direction away from the ring 165. This snap ring 175 has running clearance with both the collar 170 and the ball retainer 174.

The heavy spring 176 engages the collar 170 at one end and engages the collar 177 at the other end. This latter collar is supported on the adjusting nut 178 by means of the bearing assembly 179. The adjusting nut 178 engages threads provided on the driving member 169.

The clutch sleeve 180 which is slidably mounted on the outer surface of the driving member 169 is prevented from turning with respect thereto by means of the balls 181 which extend into the axial keyways 182 in the driving member 169. The balls also extend into keyways 183 provided in the clutch sleeve 180. A washer 184 is mounted at one end of the series of balls 181 and this washer is engaged by a relatively light spring 185. The other end of the spring engages the shoulder 186 on the tube 187. This tube or latch sleeve 187 is mounted to slide and rotate on the outer surface of the driving member 169 and carries an axially extending slot 188. This slot slidably receives a pin 189 which projects radially from the clutch sleeve 180. Hence, the parts 180 and 187 may have relative axial movement but turn as a unit. The spring 190 is operatively interposed between the tube 187 and the stop collar 191 fixed on the driving member 169. This spring 190 acts in conjunction with the spring 185 to maintain the clutch jaws 192 and 193 in engagement. The jaws 192 are formed on the clutch sleeve 180 and the jaws 193 are formed on the collar 170. The engaging surfaces 194 and 195 of these jaws are formed with a negative rake angle, as best shown in FIGURE 19.

A piston element 196 is slidably mounted within the axial bore 197 in the driving member 169. One end of this piston element is engaged by a light spring 198. The spring also engages the stop element 199 which is fixed to the work holder 162 by means of the pin 200. The piston element 196 is provided with a conical surface 201 which engages balls 202. These balls are mounted to move in the radially extending openings 203 provided in the driving member 169. When the piston element 196 moves to the left, as viewed in FIGURES 15 and 16, the balls 202 are brought into frictional engagement with the cylindrical bore 204 in the tube member 187. When the piston element 196 is moved to the right by contact with the shoulders 196*a* and 196*b*, the balls 202 are released so that the tube member 187 is free to move axially.

In the operation of this form of my invention, the driving member 169 is connected by suitable parts 205 to an air motor assembly or to the prime mover 206. Axial pressure applied to the prime mover first closes the clutch jaws 163 and 164 against the action of the spring 167. Rotation of the driving member 169 causes the work holder 162 to be driven through the engaged surfaces 166 of the clutch jaws 163 and 164. The balls 173 remain within their respective indentations 171 and 172 on the parts 170 and 165 and, therefore, serve to drive the ring 165 from the collar 170. The clutch jaws 192 and 193 enable the clutch sleeve 180 to drive the collar 170. The clutch sleeve 180 is, in turn, driven from the driving member 169 through the balls 181.

The entire device turns as a unit until the torque resistance to the work reaches a predetermined magnitude. At that instant, the resistance to turning becomes greater than the torque which the balls 173 can transmit to the ring 165. The collar 170 moves axially in a direction to compress the heavy spring 176 and the additional clearance space between the confronting faces carrying the indentations 171 and 172 permits the balls 173 each to roll out of the indentations and then drop into the next indentation in the series. This action permits the heavy spring 176 to return the collar 170 toward its initial position. However, the clutch sleeve 180 does not return to its initial position because it is held in retracted position by means of the tube member 187. The tube member 187 is held in retracted position by the action of the balls 202 entering the recess 207. The result is that the clutch jaws 192 and 193 are disengaged. The parts are then in the position shown in FIGURE 16.

The driven member 162 which holds the tool 16 instantly comes to rest, while the driving member 169 continues to rotate. The collar 170, ring 165 and balls 173 remain at rest with the tool 16 and driven member 162.

The clutch jaws 163 and 164 are disengaged when the operator retracts the device axially away from the work. This disengaging action of the clutch jaws is effected by the action of the spring 167. The same axial movement which disengages the clutch jaws 163, 164 causes the post 196 to move in a direction to release the balls 202 and thereby allow the spring 190 to move the tube member 187 in a direction to engage the clutch jaws 192 and 193.

If the balls 202 directly contacted the clutch sleeve 180, the clutch jaws 192 and 195 would be disengaged occasionally. Thus, if the operator should drive a screw until the rated torque load were reached, and then kill the motor before removing the device from the work, the clutch jaws 192 and 195 would disengage, but might not re-engage properly and might "hang-up" with the high parts on one set of jaws resting on the high parts of the other. If this should occur and if the operator set the device to turn another screw with a dead motor, this would put pressure on the balls 202 which would hold the clutch sleeve 180 in retracted position, thereby causing the parts of the device to assume the free-wheeling position. By causing the balls 202 to lock against the sleeve 187, the above stated difficulty is overcome; when release takes place, the sleeve 187 returns to its normal position and if the clutch jaws 192 and 193 are not properly engaged, the clutch sleeve 180 remains in retracted position against the pressure of spring 185 and thus remains poised for engagement even though balls 202 have become pressurized. In other words, this arrangement makes it impossible to have the clutch jaws locked in open position, regardless of the manner of use of the tool by the operator.

The negative rake angle on the clutch jaw faces prevents accidental disengagement of the parts, even though the operator should relax the axial pressure on the tool.

The washer 184 serves to return the rolling key balls 181 to the starting position at the end of each cycle of operation and thereby prevents development of any substantial friction forces opposing axial movement of the clutch sleeve 180.

It should also be noted that in each of the forms of my invention illustrated, the rotating parts are dynamically balanced so that regardless of speed of rotation objectionable lateral forces are eliminated.

Having fully described my invention, it is to be understood that I do not wish to be limited to the details herein set forth but my invention is of the full scope of the appended claims.

I claim:

1. In a torque-limiting clutch device, the combination of: a rotary driving member, a coaxial rotary driven member, a compression spring, a collar mounted on one of the members and held against axial movement relative thereto, one end of the spring engaging said collar, a pair of coaxial disks mounted on said member, said disks having confronting faces each provided with a circumferential series of indentations, a plurality of balls interposed between said faces and engageable with said indentations, one of the disks being contacted by the other end of said spring, means mounting said disk for axial movement by the balls to compress the spring upon the torque load between said members exceeding a predetermined limit, manual clutch means including negative rake jaws on the other of the said members and on the other of said disks engageable through relative axial movement of said members, a torque transmitting clutch sleeve within the spring having clutch elements engageable with said axially movable disk, said clutch sleeve being movable axially by said disk to retracted position, latch means including a latching plunger mounted for axial movement within the other member and having a taper surface, ball elements mounted on said other member contacted by said taper surface of said plunger and adapted to move outward to hold the clutch sleeve in retracted position while permitting said spring to return the axially movable disk to its initial position, thereby separating the clutch sleeve from the said disks, and means whereby the plunger is actuated by said relative axial movement of said members to move the ball elements outward.

2. The combination set forth in claim 1 in which the negative rake jaws are provided on the driving member and wherein the latching ball elements are provided on the driven member.

3. The combination set forth in claim 1 in which the negative rake jaws are provided on the driven member and wherein the latching ball elements are provided on the driving member.

4. In a torque-limiting clutch device, the combination of: a rotary driving member, a coaxial rotary driven member, a compression spring, a collar mounted on the driving member and held against axial movement relative thereto, one end of the spring engaging said collar, a pair of coaxial disks mounted on the driving member and having confronting faces each provided which a circumferential series of indentations, a plurality of balls interposed between said faces and engageable with said indentations, one of the disks being contacted by the other end of said spring, means mounting said disk for axial movement by the balls to compress the spring upon the torque load between said members exceeding a predetermined limit, manual clutch means including negative rake jaws on one of the said members and on the other disk engageable through relative axial movement of said members, a torque transmitting clutch sleeve within the spring having clutch elements engageable with said axially movable disk, said clutch sleeve being movable axially by the latter said disk to retracted position, means for driving said clutch sleeve from said rotary driving member, latch means including a latch sleeve having an axial lost-motion connection with said clutch sleeve, a latching plunger mounted for axial movement within the other member and having a taper surface, ball elements mounted on said other member contacted by said taper surface of said plunger and adapted to move outward to engage within said latch sleeve and thereby hold the clutch sleeve in retracted position while permitting said spring to return the axially movable disk to its initial position, thereby separating the clutch sleeve from the said disk, and means whereby the plunger is actuated by said relative axial movement of said members to move the ball elements outward.

5. In a torque-limiting clutch device, the combination of: a rotary driving member, a coaxial rotary driven member, a compression spring, a collar mounted on the driving member and held against axial movement relative thereto, one end of the spring engaging said collar, a pair of coaxial disks mounted on the driving member and having confronting faces each provided with a circumferential series of indentations, a plurality of balls interposed between said faces and engageable with said indentations, one of the disks being contacted by the other end of said spring, means mounting said disk for axial movement by the balls to compress the spring upon the torque load between said members exceeding a predetermined limit, manual clutch means including negative rake jaws on the driven member and on the other disk engageable through relative axial movement of said members, a torque transmitting clutch sleeve within the spring having clutch elements engageable with said axially movable disk, said clutch sleeve being movable axially by the latter said disk to retracted position, means for driving said clutch sleeve from said rotary driving member, latch means including a latch sleeve having an axial lost-motion connection with said clutch sleeve, a latching plunger mounted for axial movement within the driving member and having a taper surface, ball elements mounted on said driving member contacted by said taper surface of said plunger and adapted to move outward to engage within said latch sleeve and thereby hold the clutch sleeve in retracted position while permitting said spring to return the axially movable disk to its initial position, thereby separating the clutch sleeve from the said disk, and means whereby the plunger is actuated by said relative axial movement of said members to move the ball elements outward.

6. In a torque transmitting device, the combination of: a rotary driving member, a coaxial rotary driven member, a torque limiting mechanism operatively interposed between said members, said mechanism including a spring, a collar mounted on the driving member and held against axial movement relative thereto, one end of the spring engaging said collar, a pair of coaxial disks mounted on the driving member and having confronting faces each provided with a circumferential series of indentations, a plurality of balls interposed between said faces and engageable with said indentations, one of the disks being contacted by the other end of said spring, means mounting said disk for axial movement by the balls to compress the spring upon the torque load exceeding a predetermined limit, said mechanism also including a torque-transmitting element engageable with said movable disk and movable axially by the movable disk to a retracted position, latch means for maintaining the said element in retracted position while permitting said spring to return said movable disk to its initial position, thereby separating said element from said movable disk to prevent transmission of torque therethrough, releasable clutch means engageable upon relative axial movement of said members and interposed between the torque limiting mechanism and said driven member, and means actuated by said relative movement to energize the said latch means.

7. In a torque limiting clutch device, the combination of: a rotary driving member, a coaxial rotary driven member, a collar mounted on the driving member and held against axial movement relative thereto, a compression spring encircling the driving member and having one end engaging said collar, a pair of coaxial disks mounted on the driving member and having confronting faces each provided with a circumferential series of indentations, a plurality of balls interposed between said faces and engageable with said indentations, one of the disks being contacted by the other end of said spring, means mounting said disk for axial movement by the balls to compress the spring upon the torque load between said members exceeding a predetermined limit, releasable clutch means for driving the driven member from the other of the disks and engageable through relative axial movement, a torque transmitting clutch sleeve having clutch elements engageable with said axially movable disk, the driving member and the clutch sleeve being provided with aligned axial grooves, balls in said grooves keying the clutch sleeve for axial but nonrotary movement relative to said driving member, said clutch sleeve being movable axially by said movable disk to retracted position to disengage said clutch elements, latch means including a latch sleeve having an axial lost-motion connection with said clutch sleeve, a latching plunger mounted for axial movement within the driving member and having a taper surface, ball elements mounted on said driving member contacted by said taper surface of said plunger and adapted to move upward to engage within said latch sleeve and thereby hold the clutch sleeve in retracted position while permitting said spring to return the axially movable disk to its initial position, thereby separating the clutch sleeve from the said movable disk, and means whereby the plunger is actuated by relative axial movement of said members to move the ball elements outward.

8. The combination set forth in claim 1 in which the clutch sleeve and the latter said member are provided with aligned axial grooves, balls mounted to roll in said grooves to key the clutch sleeve for axial but non-rotary movement relative to said member, the balls having an initial position in the grooves before the clutch sleeve is moved to retracted position, resilient means for returning the clutch sleeve axially into engagement with said axially movable disk upon release of said latch means, and means on the clutch sleeve acting to insure return of the latter said balls to their initial position in the aligned grooves upon release of said latch means.

References Cited in the file of this patent

UNITED STATES PATENTS

| | | |
|---|---|---|
| 1,555,098 | Benko | Sept. 29, 1925 |
| 2,724,299 | Amtsberg | Nov. 22, 1955 |
| 2,741,352 | Stevens et al. | Apr. 10, 1956 |
| 2,743,636 | Shaff | May 1, 1956 |
| 2,765,059 | Amtsberg | Oct. 2, 1956 |
| 2,780,332 | Stevens | Feb. 5, 1957 |
| 2,881,888 | Amtsberg | Apr. 14, 1959 |
| 2,884,103 | Connell | Apr. 28, 1959 |
| 2,966,973 | Hayes | Jan. 3, 1961 |